US012646037B2

(12) United States Patent
Mueller et al.

(10) Patent No.: US 12,646,037 B2
(45) Date of Patent: Jun. 2, 2026

(54) SYSTEMS AND METHODS FOR ARTIFICIAL INTELLIGENCE-BASED ATM SERVICE

(71) Applicant: Wells Fargo Bank, N.A., San Francisco, CA (US)

(72) Inventors: Stephen George Mueller, San Francisco, CA (US); Jonathan Baker, San Francisco, CA (US); Frank DiGangi, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 2 days.

(21) Appl. No.: 18/611,425

(22) Filed: Mar. 20, 2024

(65) Prior Publication Data

US 2025/0299164 A1 Sep. 25, 2025

(51) Int. Cl.
G06Q 30/00 (2023.01)
G06N 20/00 (2019.01)
G06Q 10/20 (2023.01)

(52) U.S. Cl.
CPC ............ G06Q 10/20 (2013.01); G06N 20/00 (2019.01)

(58) Field of Classification Search
CPC ............................... G06Q 10/20; G06N 20/00
See application file for complete search history.

(56) References Cited

U.S. PATENT DOCUMENTS

| | | | |
|---|---|---|---|
| 2005/0173515 A1* | 8/2005 | Sawa .................... | G07F 19/207 |
| | | | 235/379 |
| 2014/0107836 A1* | 4/2014 | Crews ................... | G07F 19/209 |
| | | | 700/236 |
| 2018/0165413 A1* | 6/2018 | Zhang .................... | G16H 50/20 |
| 2019/0096196 A1 | 3/2019 | Cifarelli et al. | |
| 2019/0303258 A1 | 10/2019 | Kumar | |
| 2020/0019935 A1* | 1/2020 | Jan .................... | G06Q 10/06311 |
| 2020/0193242 A1* | 6/2020 | Beveridge .............. | G06N 20/00 |
| 2021/0335141 A1 | 10/2021 | Taylor et al. | |

(Continued)

OTHER PUBLICATIONS

R. de Lemos, J. Timmis, M. Ayara and S. Forrest, "Immune-Inspired Adaptable Error Detection for Automated Teller Machines," in IEEE Transactions on Systems, Man, and Cybernetics, Part C (Applications and Reviews), vol. 37, No. 5, pp. 873-886, Sep. 2007, doi: 10.1109/TSMCC.2007.900662. (Year: 2007).*

(Continued)

*Primary Examiner* — Matthew T Sittner
(74) *Attorney, Agent, or Firm* — Foley & Lardner LLP

(57) ABSTRACT

Systems and methods for servicing an ATM may include maintaining, by one or more processors, a machine learning model trained to determine one or more actions corresponding to automated teller machines (ATMs), receiving, by the one or more processors, an error code corresponding to an ATM, determining, by the one or more processors, a service history associated with the ATM, applying, by the one or more processors as an input, data corresponding to the service history and the error code to the machine learning model, to determine one or more actions for responding to the error code corresponding to the ATM, and providing, by the one or more processors, the one or more actions for rendering on a user interface, to facilitate servicing the ATM.

20 Claims, 7 Drawing Sheets

(56) References Cited

U.S. PATENT DOCUMENTS

| | | | |
|---|---|---|---|
| 2023/0199116 A1* | 6/2023 | Koneru | G06F 40/35 |
| | | | 379/88.01 |
| 2024/0290182 A1* | 8/2024 | Sethia | G07F 19/211 |
| 2024/0330879 A1* | 10/2024 | Ratcliffe, Jr. | G08B 21/18 |
| 2024/0395115 A1* | 11/2024 | Singh | G06T 19/006 |
| 2024/0404374 A1* | 12/2024 | Garg | H04L 9/3239 |
| 2024/0404375 A1* | 12/2024 | Garg | G07F 19/209 |
| 2025/0156681 A1* | 5/2025 | Palpant | G06N 20/00 |

OTHER PUBLICATIONS

J. Wang, C. Li, S. Han, S. Sarkar and X. Zhou, "Predictive maintenance based on event-log analysis: A case study," in IBM Journal of Research and Development, vol. 61, No. 1, pp. 11:121-11:132, Jan. 1-Feb. 2017, doi: 10.1147/JRD.2017.2648298. (Year: 2017).*
Nadila Silva Azevedo et al. "A novel Methodology for Developing Troubleshooting Chatbots Applied to ATM Technical Maintenance Support", MDPI, 2023.

* cited by examiner

100

Actual Output
110

Comparator
108

Training
Inputs 102

Machine Learning
Model 104

Predicted
Output 106

Error Signal 112

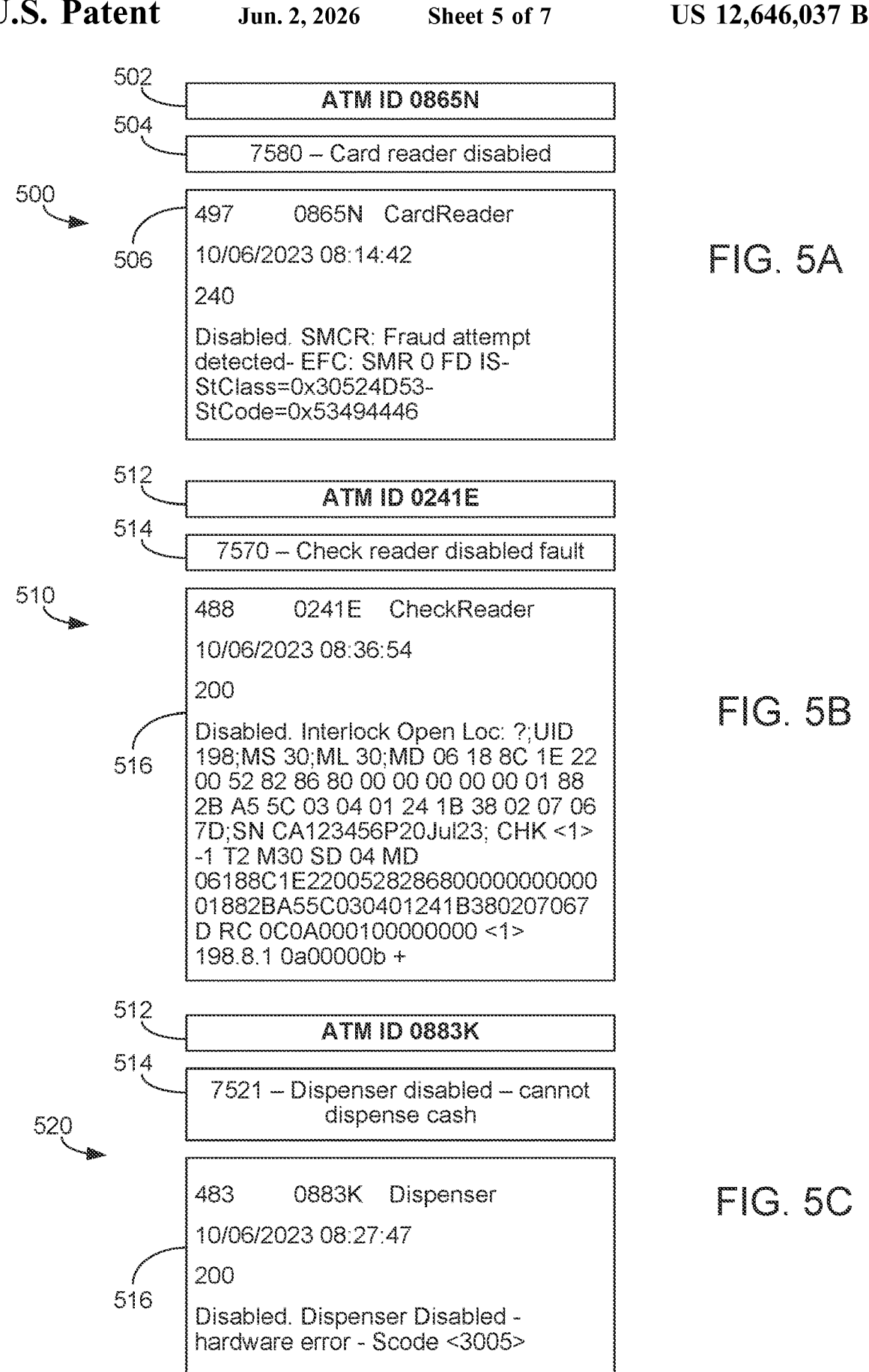

502

ATM ID 0865N

504

7580 – Card reader disabled

500

506

497     0865N   CardReader

10/06/2023 08:14:42

240

Disabled. SMCR: Fraud attempt detected- EFC: SMR 0 FD IS-StClass=0x30524D53-StCode=0x53494446

ATM ID 0241E

514

7570 – Check reader disabled fault

510

516

488     0241E   CheckReader

10/06/2023 08:36:54

200

Disabled. Interlock Open Loc: ?;UID 198;MS 30;ML 30;MD 06 18 8C 1E 22 00 52 82 86 80 00 00 00 00 00 01 88 2B A5 5C 03 04 01 24 1B 38 02 07 06 7D;SN CA123456P20Jul23; CHK <1> -1 T2 M30 SD 04 MD 06188C1E220052828680000000000 01882BA55C030401241B380207067 D RC 0C0A000100000000 <1> 198.8.1 0a00000b +

ATM ID 0883K

514

7521 – Dispenser disabled – cannot dispense cash

520

483     0883K   Dispenser

10/06/2023 08:27:47

200

Disabled. Dispenser Disabled - hardware error - Scode <3005>

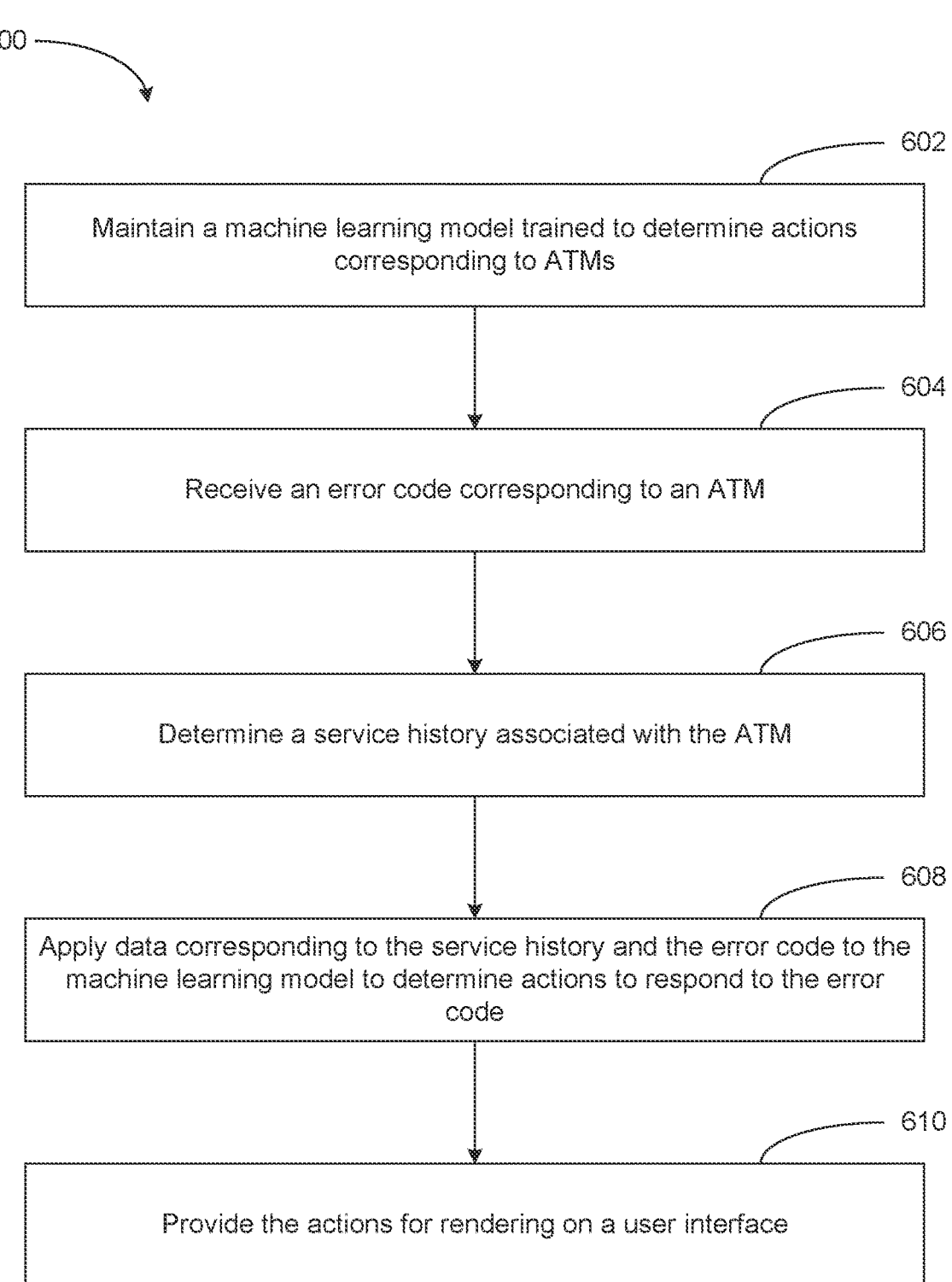

600

602

Maintain a machine learning model trained to determine actions corresponding to ATMs

604

Receive an error code corresponding to an ATM

606

Determine a service history associated with the ATM

608

Apply data corresponding to the service history and the error code to the machine learning model to determine actions to respond to the error code

610

Provide the actions for rendering on a user interface

FIG. 6

SYSTEMS AND METHODS FOR ARTIFICIAL INTELLIGENCE-BASED ATM SERVICE

TECHNICAL FIELD

The present disclosure relates to using artificial intelligence to service an automated teller machine (ATM).

BACKGROUND

ATMs can be deployed or provided at various locations, such as free standing locations, at a branch for a financial institutions, etc. At various points in time, ATMs may require servicing. For example, such servicing may involve routine inspections or upgrades, repairs or diagnostics in response to an error or malfunction, and so forth. Conventionally, to service an ATM, an ATM servicer may need to visit the ATM to manually inspect the ATM to diagnose a particular issue with the ATM.

SUMMARY

This disclosure relates to systems, methods, and devices for servicing an ATM.

At least one aspect of this disclosure relates to a method. The method includes maintaining, by one or more processors, a machine learning model trained to determine one or more actions corresponding to automated teller machines (ATMs). The method further includes receiving, by the one or more processors, an error code corresponding to an ATM. The method further includes determining, by the one or more processors, a service history associated with the ATM. The method further includes applying, by the one or more processors as an input, data corresponding to the service history and the error code to the machine learning model, to determine one or more actions for responding to the error code corresponding to the ATM. The method further includes providing, by the one or more processors, the one or more actions for rendering on a user interface, to facilitate servicing the ATM.

In some embodiments, the method further includes training, by the one or more processors, during a training phase, the machine learning model using a plurality of training sets corresponding to ATM servicing. In some embodiments, the plurality of training sets include a first training set, a second training set, and a third training set, the first training set including data corresponding to a plurality of error codes corresponding to ATMs, the second training set including data corresponding to a plurality of service history sets for respective ATMs, and the third training set including data indicative of actions for servicing the respective ATMs. In some embodiments, receiving the error code includes receiving, by the one or more processors, during a session between an operator at a branch including the ATM and a service center, the error code corresponding to the ATM.

In some embodiments, providing the one or more actions for rendering on the user interface includes transmitting, by the one or more processors, data corresponding to the one or more actions for rendering on a device at at least one of the branch or the service center. In some embodiments, the machine learning model includes a first machine learning model. In some embodiments, the method further includes generating, by the one or more processors, via a second machine learning model, a content item indicating the one or more actions for rendering at the device. In some embodiments, the first machine learning model includes at least one of a regression model, a classification algorithm, or reinforcement learning. In some embodiments, the second machine learning model includes at least one of a generative adversarial network or a variational autoencoder. In some embodiments, the method further includes performing, by the one or more processors, at least some of the one or more actions for responding to the error code. In some embodiments, the at least some actions include at least one of updating a service ticket, escalating the service ticket, or dispatching a service provider to the ATM.

At least one aspect of this disclosure relates to a system including a processing circuit including one or more processors and memory storing instructions that, when executed by the one or more processors, cause the processing circuit to maintain a machine learning model trained to determine one or more actions corresponding to automated teller machines (ATMs). The instructions may further cause the processing circuit to receive an error code corresponding to an ATM. The instructions may further cause the processing circuit to determine a service history associated with the ATM. The instructions may further cause the processing circuit to apply, as an input, data corresponding to the service history and the error code to the machine learning model, to determine one or more actions for responding to the error code corresponding to the ATM. The instructions may further cause the processing circuit to provide the one or more actions for rendering on a user interface, to facilitate servicing the ATM.

In some embodiments, the instructions further cause the processing circuit to train, during a training phase, the machine learning model using a plurality of training sets corresponding to ATM servicing. In some embodiments, the plurality of training sets include a first training set, a second training set, and a third training set, the first training set including data corresponding to a plurality of error codes corresponding to ATMs, the second training set including data corresponding to a plurality of service history sets for respective ATMs, and the third training set including data indicative of actions for servicing the respective ATMs. In some embodiments, the instructions that cause the processing circuit to receive an error code further cause the processing circuit to receive, during a session between an operator at a branch including the ATM and a service center, the error code corresponding to the ATM.

In some embodiments, the instructions that cause the processing circuit to provide the one or more actions for rendering on the user interface further cause the processing circuit to transmit data corresponding to the one or more actions for rendering on a device at at least one of the branch or the service center. In some embodiments, the machine learning model includes a first machine learning model. In some embodiments, the instructions further cause the processing circuit to generate, via a second machine learning model, a content item indicating the one or more actions for rendering at the device. In some embodiments, the first machine learning model includes at least one of a regression model, a classification algorithm, or reinforcement learning. In some embodiments, the second machine learning model includes at least one of a generative adversarial network or a variational autoencoder. In some embodiments, the instructions further cause the processing circuit to perform at least some of the one or more actions for responding to the error code. In some embodiments, the at least some actions include at least one of updating a service ticket, escalating the service ticket, or dispatching a service provider to the ATM.

At least one aspect of the disclosure relates to a non-transitory computer readable medium storing instructions that, when executed by one or more processors, cause the one or more processors to maintain a machine learning model trained to determine one or more actions corresponding to automated teller machines (ATMs). The instructions may further cause the one or more processors to receive an error code corresponding to an ATM. The instructions may further cause the one or more processors to determine a service history associated with the ATM. The instructions may further cause the one or more processors to apply, as an input, data corresponding to the service history and the error code to the machine learning model, to determine one or more actions for responding to the error code corresponding to the ATM. The instructions may further cause the one or more processors to provide the one or more actions for rendering on a user interface, to facilitate servicing the ATM.

In some embodiments, the instructions further cause the one or more processors to train, during a training phase, the machine learning model using a plurality of training sets corresponding to ATM servicing.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE DRAWINGS

FIG. 5A is a diagram illustrating an error code of the system of FIG. 3, according to an exemplary embodiment.

FIG. 5B is a diagram illustrating an error code of the system of FIG. 3, according to an exemplary embodiment.

FIG. 5C is a diagram illustrating an error code of the system of FIG. 3, according to an exemplary embodiment.

FIG. 6 is a flow diagram of a method of servicing an ATM system, according to an exemplary embodiment.

DETAILED DESCRIPTION

Figure 1:
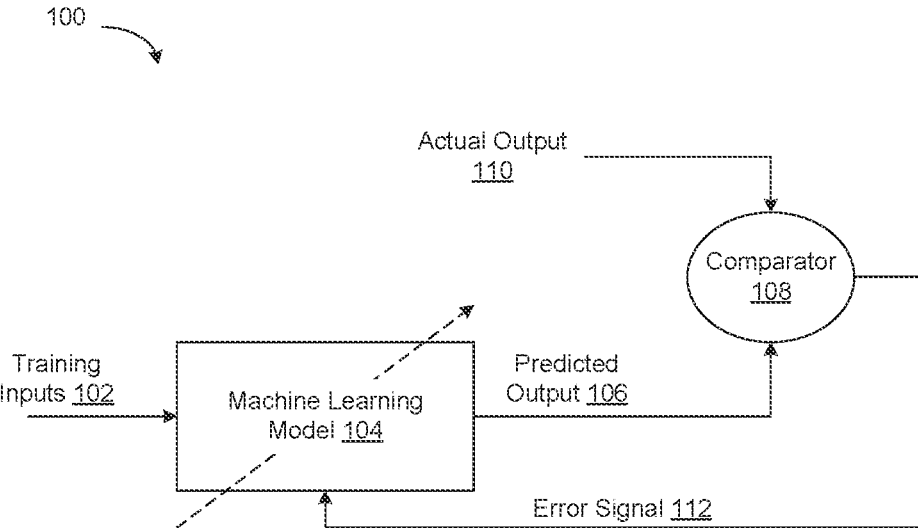
FIG. 1 is a block diagram of a machine learning system, according to an exemplary embodiment.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, systems, devices, and methods for servicing an ATM are disclosed according to various embodiments described herein. In some instances, the systems, devices, and methods described herein allow for users or ATM servicers (e.g., agents of a financial institution, repair or service technicians, etc.) to utilize an artificial intelligence (AI) system to diagnose problems, errors, or faults of an ATM, and/or provide recommended actions to take to service and repair the ATM. Beneficially, the AI system may utilize error or fault codes unreadable to humans to understand an error and provide a solution for resolving the error or fault code. The AI system may utilize historical service data of one or more ATMs to diagnose the error. Furthermore, the systems, devices, and methods described herein generate and provide various user interfaces to a device (e.g., the ATM or another remotely located device) to illustrate the problem occurring on the ATM, recommended solutions to repair the ATM, and/or instruction(s) on how to repair the ATM, in addition to various other functionalities described herein.

By leveraging artificial intelligence in servicing ATMs, the systems and methods described herein can reduce ATM downtime (e.g., how long an ATM is out of service). By training on historical data, such as trends in error codes and service histories, or previous diagnostic codes, the AI system can proactively identify issues or potential issues with the ATM before a downtime occurs. For example, the AI system may use previous diagnostic codes generated for an ATM to predict that an ATM has not yet, but is likely to generate an error code. The prediction may cause a service technician to repair the ATM prior to the generation of the error code, thus resolving the issue prior to the issue causing a shutdown or downtime of the ATM. Further, by training the AI system on historical tends and/or previous diagnostic codes, the AI system may be able to identify previously-implemented solutions to similar error codes occurring on similar ATMs. Thus, the AI system can recommend a solution that is likely to resolve the issue, thereby more quickly addressing the present problem for the ATM.

By utilizing generative artificial intelligence, the AI system may be able to produce real-time training and/or assistance in running diagnostics for use by a service technician repairing an ATM. The generated training and/or assistance outputs may use real-time feedback related to the ATM. For example, the AI system may generate a video indicating how to perform a step for servicing the ATM, responsive to the service technician performing a previous step. The real-time training or assistance may be provided in the form of a content item, such as a video.

The AI system may be able to intuit problems and diagnose issues. The AI system on the ATM may be able to send information to a remote location to aid in diagnosing and servicing the ATM. For example, the ATM can send information to a remote service center and a user at the service center may be able to see information that the ATM can "see" (e.g., information displayed on the ATM is also displayed on a device at the service center, such that the compute device at the remote service center functions as a "digital twin" of the ATM).

Technically and beneficially, the AI-based ATM servicing system may allow an agent or technician to view the ATM and the service and/or activity history of the ATM, thus allowing for reduce times to diagnose problems and determine solutions. The ATM may be able to more quickly retrieve large amounts of relevant data compared to an agent or technician. Further, the AI system may help to clear old or resolved errors or faults such that an agent does not have to scroll through large amounts of service history or solutions, thus reducing servicing time.

Figure 2:
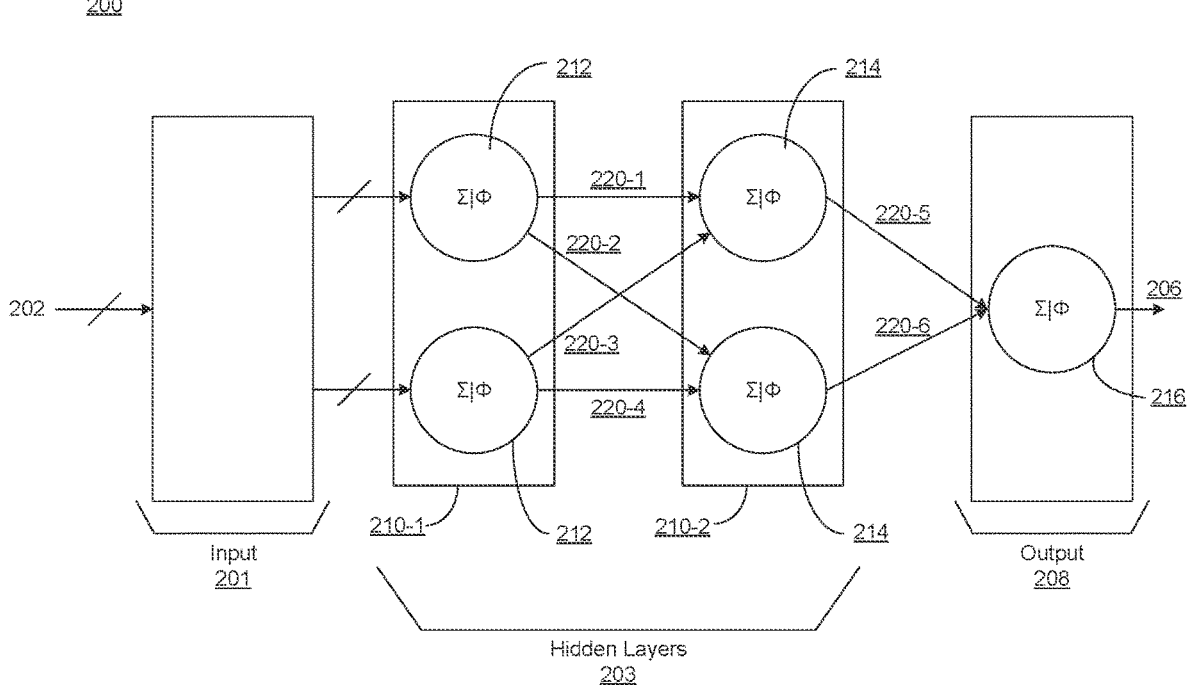
FIG. 2 is a block diagram illustrating a neural network, according to an exemplary embodiment.

Referring generally to FIG. 1 and FIG. 2, the systems and methods described herein may use, implement, or otherwise leverage various machine learning algorithms and/or artificial intelligence solutions. Examples of such solutions are described with reference to FIG. 1 and FIG. 2. While these examples are described, it is noted that additional or alternative machine learning solutions may be implemented by the systems and methods described herein.

Referring to FIG. 1, a block diagram of an example system using supervised learning (e.g., machine learning system 100), is shown. Supervised learning is a method of training a machine learning model given input-output pairs. An input-output pair is an input with an associated known output (e.g., an expected output).

A machine learning model 104 may be trained on known input-output pairs such that the machine learning model 104 can learn how to predict known outputs given known inputs. Once the machine learning model 104 has learned how to predict known input-output pairs, the machine learning model 104 can operate on unknown inputs to predict an output.

The machine learning model 104 may be trained based on general data and/or granular data (e.g., data based on a specific ATM, ATM-type, ATM-SKU or make and model, etc.) such that the machine learning model 104 may be trained specific to a particular ATM.

Training inputs 102 and actual outputs 110 may be provided to the machine learning model 104. Training inputs 102 may include previous ATM errors, a plurality of error codes corresponding to ATMs, data corresponding to a plurality of service history sets, such as previously-resolved issues, previously-attempted resolutions, and previous ATM errors and the corresponding successful solutions, data indicative of actions for servicing an ATM, and the like. Training inputs 102 may further include a correlation between a transaction history and a volume of transactions on the ATM, detailed information of the error or fault code, historic information for the ATM, and the like. In various embodiments, previous resolution information as a training input 102 may increase accuracy of the solution output by the ML system 100. Previously-attempted solution may be used so that the ML system 100 can analyze trends and output accurate solutions. For example, the ML system 100 may utilize, as an input, previous actions taken by a service technician to resolve an error. From the inputs, the ML system 100 may be able generate, as an output, a recommendation that a service technician start with a certain action as opposed to another action that was previously attempted and unsuccessful at resolving the particular error code. Actual outputs 110 may include a successful solution to resolve an error code on an ATM, an unsuccessful solution to an error code on an ATM, one or more actions to take or that have previously been taken to resolve an error code, and the like.

The inputs 102 and actual outputs 110 may be received from one or more data repositories (e.g., one or more data sources 322, as described below with reference to FIG. 3). For example, a data repository may contain data associated with the ATM itself. For example, the data repository may include previous errors occurring on the ATM, services performed on the ATM, etc. The data repository may also contain data relating to other ATMs, such as error codes found on other ATMs and corresponding successful and/or unsuccessful solutions. The data repository may also contain data internal to the financial institution, such as transaction history for accounts linked to the financial institution taking place on the ATM. Thus, the machine learning model 104 may be trained to predict solutions for repairing an ATM responsive to an error code of the ATM based on the training inputs 102 and actual outputs 110 used to train the machine learning model 104.

The machine learning system 100 may include one or more machine learning models 104. In an embodiment, a first machine learning model 104 may be trained to predict data relating to steps for servicing an ATM experiencing an error. For example, the first machine learning model 104 may use the training inputs 102, such as solutions performed to resolve previous error codes, to predict outputs 106, such as recommended solutions for current error codes, by applying the current state of the first machine learning model 104 to the training inputs 102. The comparator 108 may compare the predicted outputs 106, such as a predicted or proposed solution to resolve an error code, to actual outputs 110, such as a solution actually taken to resolve the error code, to determine an amount of error or differences. For example, the predicted steps to take to resolve an error code (e.g., predicted output 106) may be compared to the actual steps taken to resolve the error code (e.g., actual output 110). The comparator 108 may determine, for example, how many steps were common between the predicted output 106 and the actual output 110.

In other embodiments, a second machine learning model 104 may be trained to make one or more recommendations to the ATM based on the predicted output from the first machine learning model 104. For example, the second machine learning model 104 may use the training inputs 102, such as error codes for an ATM, to predict outputs 106, such as predicted solutions to resolve the error codes or a plurality of actions to take to resolve the error codes, by applying the current state of the second machine learning model 104 to the training inputs 102. The comparator 108 may compare the predicted outputs 106, such as one or more actions to take to resolve an error code, to actual outputs 110, such as an actual set of predicted solutions and/or steps to resolve an error code, to determine an amount of error or differences. In some embodiments, the second machine learning model 104 may output a content item indicating the one or more actions generated as predicted outputs 106 in the first machine learning model 104. For example, the first machine learning model 104 may generate, as predicted outputs 106, one or more actions to take to resolve an ATM error code. The second machine learning model 104 may generate, as predicted outputs 106, a content item indicating the one or more actions to take to resolve the ATM error code. The content item may be, for example, a video demonstrating to a user (e.g., service technician) how to perform the one or more actions to resolve the ATM error code. For example, the video may demonstrate how an ATM service technician can access components of the ATM to service them.

The actual outputs 110 may be determined based on historic data of recommendations made to the user 132, such as previously recommended actions to take to resolve an error code. In an illustrative non-limiting example, a plurality of actions to take to resolve an error code on an ATM may be determined by comparing the error code to an error code previously found on an ATM, and outputting the steps that were taken to resolve the error code previously found on the ATM.

In some embodiments, a single machine leaning model 104 may be trained to provide one or more content items and/or recommendations to provide assistance in servicing the ATM based on current ATM data or outputs 106. That is, a single machine leaning model may be trained using the training inputs 102, such as error codes for an ATM, to predict outputs 106, such as one or more actions to take to resolve an ATM error code or a content item indicating how to perform a servicing step by applying the current state of the machine learning model 104 to the training inputs 102. The comparator 108 may compare the predicted outputs 106 to actual outputs 110, such as actions actually take by the service technician, to determine an amount of error or differences. The actual outputs 110 may be determined based on historic data associated with the recommendation to the ATM. For example, the single machine learning model may generate one or more actions to take to resolve an ATM error code based on an error code input 102. The single machine learning model may then use the predicted outputs 106 (i.e., actions to service the ATM) and/or actual outputs 110 as inputs to generate a content item illustrating how to perform a servicing step to repair the ATM.

During training, the error (represented by error signal 112) determined by the comparator 108 may be used to adjust the weights in the machine learning model 104 such that the machine learning model 104 changes (or learns) over time. The machine learning model 104 may be trained using a backpropagation algorithm, for instance. The backpropagation algorithm operates by propagating the error signal 112. The error signal 112 may be calculated each iteration (e.g., each pair of training inputs 102 and associated actual outputs 110), batch and/or epoch, and propagated through the algorithmic weights in the machine learning model 104 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 104 may be tuned to reduce the amount of error, thereby minimizing the differences between (or otherwise converging) the predicted output 106 and the actual output 110. The machine learning model 104 may be trained until the error determined at the comparator 108 is within a certain threshold (or a threshold number of batches, epochs, or iterations have been reached). The trained machine learning model 104 and associated weighting coefficients may subsequently be stored in memory 116 or other data repository (e.g., a database) such that the machine learning model 104 may be employed on unknown data (e.g., not training inputs 102). Once trained and validated, the machine learning model 104 may be employed during a testing (or an inference phase). During testing, the machine learning model 104 may ingest unknown data to predict future data (e.g., future error codes, future actions to take, and the like).

Referring to FIG. 2, a block diagram of a simplified neural network model 200 is shown. The neural network model 200 may include a stack of distinct layers (vertically oriented) that transform a variable number of inputs 202 being ingested by an input layer 204, into an output 206 at the output layer 208.

The neural network model 200 may include a number of hidden layers 210 between the input layer 204 and output layer 208. Each hidden layer has a respective number of nodes (212, 214 and 216). In the neural network model 200, the first hidden layer 210-1 has nodes 212, and the second hidden layer 210-2 has nodes 214. The nodes 212 and 214 perform a particular computation and are interconnected to the nodes of adjacent layers (e.g., nodes 212 in the first hidden layer 210-1 are connected to nodes 214 in a second hidden layer 210-2, and nodes 214 in the second hidden layer 210-2 are connected to nodes 216 in the output layer 208). Each of the nodes (212, 214 and 216) sum up the values from adjacent nodes and apply an activation function, allowing the neural network model 200 to detect nonlinear patterns in the inputs 202. Each of the nodes (212, 214 and 216) are interconnected by weights 220-1, 220-2, 220-3, 220-4, 220-5, 220-6 (collectively referred to as weights 220). Weights 220 are tuned during training to adjust the strength of the node. The adjustment of the strength of the node facilitates the neural network's ability to predict an accurate output 206.

In some embodiments, the output 206 may be one or more numbers. For example, output 206 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

Figure 3:
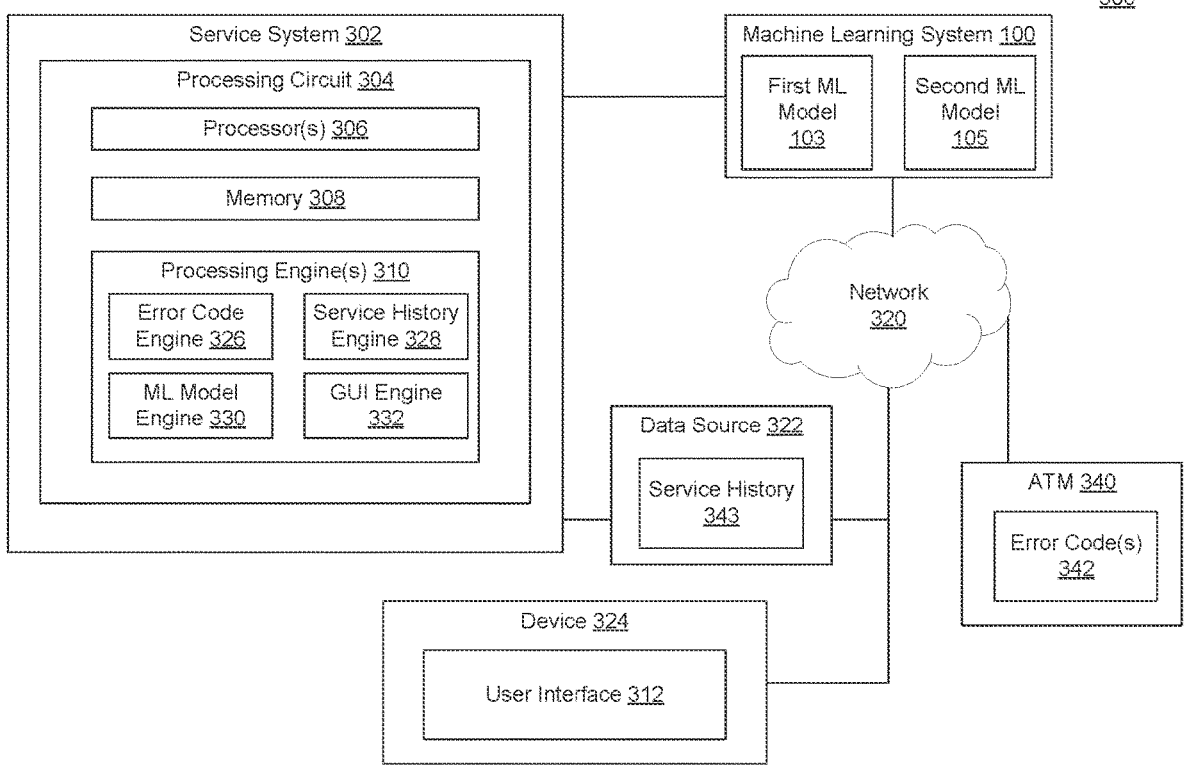
FIG. 3. is a block diagram of an ATM servicing system, according to an exemplary embodiment.

Referring now to FIG. 3, a block diagram of system 300 (e.g., an ATM servicing system) is shown, according to an exemplary embodiment. In brief overview, the system 300 includes a service system 302 communicably coupled (e.g., via one or more networks 320) to an ATM 340, the machine learning system 100, one or more data sources 322, and a device 324. The system 300 may be affiliated with, maintained by, controlled by, or otherwise associated with a financial institution, such as a bank. As described in greater detail below, the system 300 may be configured to maintain a machine learning model (e.g., machine learning system 100) trained to determine one or more actions corresponding to ATMs via a machine learning (ML) model engine 330. The system 300 may be configured to receive an error code 342 corresponding to an ATM 340. The system 300 may be configured to determine a service history associated with the ATM 340. The system 300 may be configured to apply, as an input, data corresponding to the service history and the error code 342 to the machine learning model via the ML model engine 330 to determine one or more actions for responding to the error code 342 corresponding to the ATM 340. The system 300 may be configured to provide the one or more actions for rendering on a user interface (e.g., user interface 312 of the device 324) to facilitate servicing the ATM 340.

The system 300 may include a service system 302, the machine learning (ML) system 100, one or more data source(s) 322, an ATM 340, and one or more device(s) 324. The service system 302, ML system 100, data source(s) 322, ATM 340, and device(s) 324 may be communicably coupled to one another via one or more networks 320.

The machine learning system 100, described in greater detail above with reference to FIGS. 1 and 2, may include a first ML model 103 and a second ML model 105. In some embodiments, the first ML model 103 may be similar to the first machine learning model 104 described above. The first ML model 103 may be at least one of a regression model, a classification algorithm, or reinforcement learning. In some embodiments, the second ML model 105 may be similar to the second machine learning model 104 described above. The second ML model 105 may be at least one of a generative adversarial network (GAN) or a variational auto-encoder. In this regard, the machine learning system 100 may include a cascaded machine learning model in which the output of one machine learning model is fed as an input to a second machine learning model.

In various embodiments, the ML system 100 may be used as a diagnostic tool. For example, the ML system 100 may receive, as inputs, one or more faults or errors (e.g., error codes 342) experienced by the ATM 340 and may output a plurality of possible causes to the problem(s) and/or solutions to the problem(s). In some embodiments, the ML system 100 may predict an error or fault before the error occurs. The predicted error may be useful when, for example, a repair technician is called to repair a problem with an ATM but does not see the problem occurring. For example, if a person attempts to deposit a check at the ATM 340 and the check deposit is rejected, a repair technician may be called to resolve the problem. However, when the repair technician arrives and attempts to deposit it check it may be accepted. Thus, the repair technician may mark the issue as resolved despite the issue still remaining. If the ML system 100 can receive and/or otherwise utilize a count of a number of times checks have attempted to be deposited but have been rejected, the ML system 100 may output a predicted error or predicted actions to take to resolve the problem, despite no error code being generated.

In various embodiments, the ML system 100 may perform a comparison between the error code 342 and problems not resulting in error codes 342 (e.g., a lack of a response to a keypad button being pushed). The ML system 100 may identify trends or correlations between error codes and problems and predict or project an issue likely to be affecting the ATM 340. Responsive to identifying trends, the ML system 100 may output one or more options to service the issue.

As a general overview of the system 300, the ATM 340 may generate an error code 342 indicating an error or problem with the ATM. The error code 342 may be communicated to and received by the service system 302. The service system 302 may deployed at a server for a financial institution, for instance. The service system 302 may process the error code 342 (e.g., by one or more processing engines 310 described herein) and may retrieve a service history 343 from a data source 322. The service system 302 may transmit the information (e.g., error code and service history) to the ML system 100. The ML system may use the information in a manner described above, and generate one or more solutions or steps to service the ATM, a user interface, one or more content items, etc. The user interface may be rendered locally on the ATM 340 or may be displayed on a user interface 312 of a device 324 (e.g., a device of a service technician).

In various embodiments, the ML system 100 may be a generative artificial intelligence system. The system may be able to generate real-time information responsive to actions occurring in real-time. For example, and in some embodiments, the ATM 340 may include speakers and/or microphones. The ATM 340 may utilize one or more of these devices to listen to a user and generate outputs responsive to the user. For example, the ATM 340 may hear a service technician state that a bill is jamming in a bill acceptor of the ATM 340. The data received at the ATM 340 may be communicated to one or more components of the service system 302, which is processed and transmitted to the ML system 100. The ML system 100 may utilize that information, in addition to other information, such as training inputs, service history, etc. to generate recommended actions to attempt to resolve the issue. The actions recommended responsive to hearing the user may replace previously-generated actions that were a result of, for example, an error code 342 received by the ML system 100. For example, the technician may be servicing the ATM 340 to repair a first problem and may verbally state a second problem. The ML system 100 may utilize generative AI to produce, in real-time, a recommendation to solve the second problem.

In various embodiments, the ML system 100 may utilize generative AI to create content items for display on the ATM 340 and/or on the device 324. The content items are described in greater detail with respect to FIG. 400 (e.g., content item 418). The ML system 100 may generate, in real time, a content item such as a video to display on the ATM 340 to a service technician, responsive to an indication that a service technician has performed an action to repair the ATM 340. The video may be useful, for example, to a new service technician working alone on a problem they have not previously encountered. The content item may correspond to the recommended steps the ML system 100 determines should be taken to resolve the issue. For example, the ML system 100 may determine five steps to resolve an error code. The ML system 100 may generate content for display on the ATM 340 or the user interface 312 corresponding to one or more of the steps to direct or demonstrate to the technician how to perform the steps. For example, a first step may be accessing an access panel of the ATM. The content item may indicate how and where to find the access panel on the ATM. In various embodiments, the content item may be generated responsive to listening to the user. For example, the ATM 340 may hear a service technician state that they do not know where to find the access panel. The ML system 100 may responsively generate a video indicating where the access panel is. In some embodiments, the user may be a person attempting to, for example, perform a transaction at the ATM, and the ML system 100 may generate content to aid the user. For example, a user may state that the card reader is not reading a bank card. The ML system 100 may generate a content item indicating the proper orientation to insert the card so that the card is successfully read.

The system 300 may include one or more ATMs 340. The ATM(s) 340 may be an electronic banking outlet that allows customers to complete one or more transactions without having to interact with a branch representative or teller of the financial institution. The ATM 340 may facilitate users to perform transactions such as, for example, withdrawing cash, depositing funds, checking account balances, and transferring money between accounts. Use of the ATM 340 may reduce a need for a user to make in-branch visits to complete various financial transactions. One or more ATMs for the financial institution may be located on site at branch locations, and/or in various public places, such as shopping centers, airports, and grocery stores. To use an ATM 340, customers may need a debit or credit card associated with the financial institution and a personal identification number (PIN) to access to their accounts.

The system 300 may include one or more device(s) 324. The system 300 may include a device 324. The device 324 may be or include any device, component, element, or hardware designed or configured to communicate with the ATM 340. In some embodiments, the device 324 may include a mobile device, a computer, or other device to be used by a user. The device 324 may be communicably coupled to the ATM 340 and/or the network 320.

The device 324 may communicate with the ATM 340. The device 324 may be at a location remote from the ATM 340. For example, the device 324 may be at a service center of the financial institution or a branch of the financial institution that is not the branch where the ATM to be serviced (i.e., ATM 340) is located. The device 324 may be utilized by a user (e.g., a service center manager, an ATM repair technician, etc.) to view information relating to the ATM experiencing an error. For example, the device 324 may be a computer at a service center located at a place different than the location of the ATM 340.

The system 300 may include one or more data source(s) 322. The data sources 322 may be or include any device, component, element, or hardware designed or configured to send or otherwise communicate data to one or more components of the ATM 340. In some embodiments, the data sources 322 may include, for example, one or more data repositories storing service histories 323 of a plurality of ATMs belonging to the financial institution, and/or error codes for ATMs and their corresponding problems. The data sources 322 may be communicably coupled to the ATM 340, to receive (e.g., via the network 320) the service history 323 of the ATM 340.

The data sources 322 may store data to be used by one or more components of the ATM 340 that is not stored locally within the ATM 340. For example, one ATM 340 may not locally store data relating to service histories 323 of other ATMs. Thus, responsive to a need for said service histories, a component of the service system 302 (e.g., service history engine 328) may retrieve service history data 323 from the data source 322 for use when servicing the ATM 340. In various embodiments, the data source 322 may be a data repository storing data that is used to train the ML system 100. Data within the data source 322 may be used for diagnostic purposes.

In some embodiments, data source 322 may store data, actions, or instances of errors that do not or have not resulted in an error code. Actions not resulting in an error code may be, for example, the number of times users cancel transactions, a user inserting a card and having no response, or a user pressing a keypad button and having no response. The ML system 100 may use the instances of non-error code errors to predict that an error may occur. For example, the ATM 340 not responding to a keypad button being pressed may indicate another underlying error that may result in an error code but has not yet. The ML system 100 may use this data, alone or in combination with, for example, underlying trends and/or a service history 323 of the ATM 340 or another ATM, to predict an error code. The ML system 100 may also output internally-identified issues (i.e., issues a user would not be able to see or identify) and a prediction that an error code may arise before the fault occurs.

The system 300 may include a service system 302. The service system 302 may be located at a service center, deployed or hosted on one or more servers (e.g., at the service center or remote from the service center, etc.). The service system 302 may include a processing circuit 304. The processing circuit 304 may be or include any device, component, element, or hardware designed or configured to implement various processes for servicing an ATM by implementing various processing engines 310 (e.g., by the processor(s) 306 executing corresponding instructions in memory 308). For example, the processing circuit 304 may be configured to execute, support, provision, or otherwise provide the ATM 340. The processing engine(s) 310 may include an error code engine 326, a service history engine 328, a ML engine 330, and a GUI engine 332, all of which are described in greater detail below.

The processing circuit 304 may include one or more processors 306. The processors 306 may be implemented or performed with a general-purpose single- or multi-chip processor, a digital signal processor (DSP), an application specific integrated circuit (ASIC), one or more field programmable gate array (FPGAs), a logic circuit, or other suitable electronic processing components. A general-purpose processor may be a microprocessor, or, any conventional processor, or state machine. A processor 306 also may be implemented as a combination of computing devices, such as a combination of a DSP and a microprocessor, a plurality of microprocessors, one or more microprocessors in conjunction with a DSP core, or any other such configuration. In some embodiments, the one or more processors 306 may be shared by multiple circuits (e.g., the circuits of the processor may comprise or otherwise share the same processor which, in some example embodiments, may execute instructions stored, or otherwise accessed, via different areas of memory). Alternatively or additionally, the one or more processors 306 may be structured to perform or otherwise execute certain operations independent of one or more co-processors. In other example embodiments, two or more processors 306 may be coupled via a bus to enable independent, parallel, pipelined, or multi-threaded instruction execution. All such variations are intended to fall within the scope of the present disclosure.

The processing circuit 304 may include a memory 308. The memory 308 (e.g., memory, memory unit, storage device, etc.) may include one or more devices (e.g., RAM, ROM, Flash memory, hard disk storage, etc.) for storing data and/or computer code for completing or facilitating the processes, layers, and modules described in the present application. The memory 308 may be or include tangible, non-transient volatile memory or non-volatile memory. The memory 308 may also include database components, object code components, script components, or any other type of information structure for supporting the activities and information structures described in the present application. According to an exemplary embodiment, the memory 308 is communicably connected to the one or more processors via the processing circuit 304 and includes computer code for executing (e.g., by the processing circuit 304 and/or the one or more processors) one or more processes described herein. For example, the memory 308 may be embodied as a non-transitory computer readable medium storing instructions executable by the processor 306 to perform various functions of the processing engines 310 and/or the ATM 340 disclosed herein. In some embodiments, the memory 308 and the processor 306 are integrated as a single component.

The processing circuit 304 may include one or more processing engines 310. The processing engines 310 may be or include any device, component, element, or hardware designed or configured to perform certain dedicated functions of the processing circuit 304 and/or the ATM 340. For example, the processing engine(s) 310 may include the error code engine 326, the service history engine 328, the ML model engine 330 and the GUI engine 332, each described in greater detail below. While these processing engine(s) 310 are shown and described, in various embodiments, additional processing engine(s) 310 may be deployed at the service system 302. Additionally, and in some embodiments, one or more of the processing engine(s) 310 may be combined with one or more other processing engine(s) 310. Further, and in some embodiments, one or more of the processing engine(s) 310 may be divided into multiple processing engine(s) 310. The processing engine(s) 310 are described in greater detail below.

The service system 302, ML system 100, data source(s) 322, device 324, and ATM(s) 340 may be communicably coupled to one another via one or more network(s) 320. The network 320 may be or include any device, component, element, or hardware designed or configured to transmit, receive, and/or facilitate the exchange or share of resources, data, and/or information among one or more components of the system 300. In some embodiments, the network 320 may be a cloud-based network. The network 320 may be communicably coupled to the ML system 100, the ATM 340, the data source 322, and/or the device 324.

The network 320 may facilitate an exchange or communication of data not stored locally on the ATM 340. For example, the ATM 340 may offload service history 323 to one or more data sources 322. The ATM 340 may request to receive data from the data source 322 when needed (e.g., when utilizing error code data from another ATM to generate a solution). The network 320 may facilitate the receipt of the data from the data source 322 to the ATM 340. The ML system 100 may access the network 320 to retrieve data stored in the data source 322 that may be used as a training input or to generate a recommendation. For example, the ML system 100 may retrieve service history data 323 relating to other ATMs (i.e., data that would not be stored locally on the ATM 340) for use in determining a recommendation to resolve an error code.

As stated above, the processing engine(s) 310 may include the error code engine 326. The error code engine 326 may be or include any device, component, element, or hardware designed or configured to receive an error code 432 corresponding to an ATM 340. The error code engine 326 may be communicably coupled to the ATM 340 and one or more components of the processing engine(s) 310, such as the ML model engine 330, the service history engine 328, and/or the GUI engine 332. The error code engine 340 may be configured to receive the error code 342, responsive to the ATM 340 generating and pushing the error code 342 to the service system 302. For example, the ATM 340 may push, communicate, transmit, or otherwise provide the error code 342 via various types or forms of networks 320, such as (but not limited to) a dial-up network, leased line of a branch, ethernet or broadband, a virtual private network (VPN), integrated services digital network (ISDN), or any other type of network 320 which may be used for communication by an ATM 340 to one or more remote locations.

The error code engine 326 may receive an error code 342. The error code 342 may be a numeric or alphanumeric code indicative of the nature of an error of the ATM 340. An error of an ATM 340 may prevent the ATM from operating or performing properly. Examples of error codes 342 may include, but are not limited to, codes representing/indicating/identifying a blocked sensor, a dispenser error (e.g., a jammed bill), no receipt paper, and/or issues reading a card. In some embodiments, each error code may correspond to a unique type of error or problem of the ATM 340. The ATM 340 may be configured to generate the error code 342 in response to a detected/identified condition corresponding to the error. The ATM 340 may be configured to transmit, communicate, send, or otherwise provide the error code 342 to the service system 302 for receipt and use by the error code engine 326. In various embodiments, the error code 342 may be communicated to the service system 302 with a particular identifier (e.g., a unique identification code or number associated with the ATM 340). Responsive to receiving the error code 342, the ML system 100 may generate a summary or brief description of the error code 342 and communicate the description to one or more components of the service system 302 (e.g., error code engine 326, ML model engine 330, etc.).

The error code engine 326 may receive the error code 342 and check the code against a database, to determine what problem the error code is indicative of. The database storing the error codes and associated problems may be, for example, data source 322. In various embodiments, receiving the error code includes receiving the error code corresponding to the ATM during a session between an operator at a branch of the financial institution and a service center. For example, if an ATM 340 is experiencing an error at a branch, an operator (e.g., a teller at the branch, a service technician, etc.) may be located at the branch or dispatched to the branch to service the ATM 340. The operator at the branch may be in communication with a service center or another operator at the service center. The operator at the service center may be able to access information relating to the ATM error by receiving, from the service system 302, the information generated by the ML system 100. In some embodiments, as will be described herein, the ATM may display information relevant to the ATM error such that the operator at the branch can view information and service the ATM.

The processing engine(s) 310 may include the service history engine 328. The service history engine 328 may be or include any device, component, element, or hardware designed or configured to determine a service history (e.g., service history 323) associated with the ATM experiencing an error. The service history engine 328 may be communicably coupled to one or more components of the processing engine(s) 310, such as the error code engine 326, the ML model engine 330, and/or the GUI engine 332.

The service history engine 328 may determine the service history associated with the ATM by retrieving information on the ATM. The information may be retrieved, for example, from the memory 308 of the ATM 340. In some embodiments, service history engine 328 may be configured to determine the service history 323 of the ATM, by accessing the data source 322 via the network 320. The service history 323 may be service history for a particular ATM 340 experiencing an error, other related ATMs (e.g., other ATMs at the same branch location), ATMs having the same type, SKU, make and/or model, etc. The service history 323 of the ATM 340 may include, for example, previous errors and error codes 342 experienced by the ATM 340, previous successful repairs to the ATM 340 and the steps taken to successfully repair the ATM, unsuccessful repair attempts to the ATM 340 and the unsuccessful steps taken, dates and times at which the errors occurred and at which the errors were resolved and/or attempted to be resolved, and the service technician repairing the ATM 340. In some embodiments, service history 323 may include call rates and/or dispatch summaries. For example, service history may include information indicating that an ATM experienced three errors, and first and second errors were resolved but the third error remained unresolved. In some embodiments, the service history engine 328 may retrieve service history 323 associated with more than one ATM. For example, the service history engine 328 may retrieve service histories or portions of service histories of ATMs that have experienced the same error code as the current ATM to be serviced. For example, if the ATM to be serviced is experiencing a 12345 error code, the service history engine 328 may retrieve service histories of one or more ATMs that have also experienced the 12345 error code to obtain information relating to steps that were taken to resolve the error, which may aid in the service of the current ATM.

In various embodiments, the service history engine 328 may receive an error code 342 from the ATM 340. The service history engine 328 may also receive an identification number corresponding to the ATM 340. The service history engine 328 may determine a make and model of the ATM 340 and perform a lookup function for the service history of the particular ATM 340 based on one or more of the make and model of the ATM and/or the identification number of the ATM. Responsive to determining the service history of the ATM 340, the service history engine 328 may perform a second lookup function using the make and model information to identify one or more service histories of related ATMs (e.g., ATMs having the same make and/or model). The service history engine 328 may filter the data corresponding to related ATMs to identify relevant information. For example, the service history engine 328 may filter by ATMs having the same error code to identify relevant service history information for the particular error code.

In various embodiments, the ML system 100 may utilize the service history 323 determined by the service history engine 328. For example, the ML system 100 may parse a service history of all ATMs operated by the financial institution and identify some or all instances within a predetermined period of time (e.g., within the past year) in which an ATM has experienced the error code 342 currently affecting the ATM 340. Based on the service history 323, the ML system 100 may propose a solution to resolve the error code. In some embodiments, the ML system 100 may choose one or more proposed solutions to provide to the user (e.g., service technician) based on previously successful solutions identified within the service history 323. The ML system 100 may utilize previous errors of the ATM 340 in conjunction with errors experienced by other ATMs to propose a solution. For example, the ATM 340 may experience an error code 342, and may have experienced two other error codes at a previous time. The ML system 100 may identify the two previous error codes and the current error code, and may parse service histories of other ATMs to identify if other ATMs have also experienced the same error codes. The ML system 100 may propose a solution to resolve the current error code based on an identification that another ATM that has experienced the same error codes in the same order as the ATM 340, and has had all of the errors resolved.

The processing engine(s) 310 may include the ML model engine 330. The ML model engine 330 may be or include any device, component, element, or hardware designed or configured to maintain a machine learning model trained to determine a plurality of actions corresponding to an ATM. The ML model engine 330 may also apply, to the machine learning model, (i.e., ML system 100), data corresponding to the service history determined by the service history engine 328 and the error code 342 received by the error code engine 326. The ML model engine 330 may be communicably coupled to one or more components of the processing engine(s) 310, such as the error code engine 326, the service history engine 328, and/or the GUI engine 332.

The ML model engine 330 may maintain the ML system 100. The ML model engine 330 may alternatively or additionally apply, as an input to the ML system 100, data corresponding to the service history 323 and the error code 342. Thus, in some embodiments, the machine learning system 100 may be stored in one or more components of the service system 302 (e.g., the processing circuit 304). As described above with reference to FIGS. 1 and 2, the ML system 100 may be trained to determine one or more actions corresponding to a plurality of ATMs. In various embodiments, the actions may be actions to be communicated to another party or location. For example, the ML system 100 may determine actions that are to be communicated to the service center. The actions determined by the ML system 100 may include, for example, creating a service ticket, updating the service ticket, escalating the service ticket, and/or dispatching a service provider to the ATM. In various embodiments, the actions may be actions to take to service and/or repair the ATM. For example, the actions may include steps to take to service the ATM and an order in which the steps should be taken, and/or recommended actions to take responsive to the ML system 100 determining that a user (e.g., service technician or agent) has performed an action on the ATM.

In various embodiments, the actions may each have a corresponding score associated with them. The score may indicate an importance or likelihood of success or likelihood that performing the action will resolve the error on the ATM 340. The ML system 100 may generate the actions to take, and concurrently or subsequently may generate a score for each action. The ML system 100 may be trained to generate the scores based on which of the recommended actions is most likely to resolve the error code. The ML system 100 may rank the actions according to the scores. The ML model engine 330 may receive the service history 323 received by the service history engine 328 and the error code 342 received by the error code engine 326 and apply the information to the ML system 100 to generate scores, rank the recommended actions, and output results according to a likelihood that taking the action will result in resolving the error.

The processing engine(s) 310 may include the GUI engine 332. The GUI engine 332 may be or include any device, component, element, or hardware designed or configured to provide the actions generated by the ML system 100 for rendering on a user interface or graphical user interface to facilitate servicing the ATM. The GUI engine 332 may be communicably coupled to one or more components of the processing engine(s) 310, such as the error code engine 326, the service history engine 328, and/or the ML model engine 330, and the user interface 312, and/or the device 324.

The GUI engine 332 may receive the actions for servicing the ATM (i.e., outputs of the ML system 100) from, for example, the ML system 100 or the ML model engine 330. The GUI engine 332 may provide the actions to a user interface to be displayed. The GUI engine 332 may further update the user interface responsive to a new or updated output from the ML system 100. In various embodiments, the GUI engine 332 may display the information on the user interface 312 of the ATM 340 and/or on the device 324. In some embodiments, the GUI engine 332 may display the information on a user interface of the device 324. For example, the device 324 may be a computer at a service center, and the GUI engine 332 may facilitate displaying the information on a screen of the computer. In some embodiments, the device 324 may be a device of the service technician repairing the ATM 340, and the GUI 332 may facilitate displaying the information on the repair technician's device (e.g., mobile phone, tablet, etc.).

The device 324 may include a user interface 312 which displays, provides, or otherwise renders the GUI generated by the GUI engine 332. In some embodiments, the user interface 312 may be displayed a screen of the ATM 340 and/or a screen or display of the device 324. The user interface 312 may be communicably coupled to one or more components of the ATM 340, such as the processing circuit 304.

The user interface 312 may display the actions and/or other outputs by the ML system 100. For example, the user interface may receive, from the ML model engine 330, actions to take to service the ATM, and display the actions in one or more manners. The user interface may also include information about the ATM, such as an identification number, the error code, and historical data (e.g., service history, activity history, etc.). The user interface will be described in greater detail with respect to FIG. 4.

Figure 4:
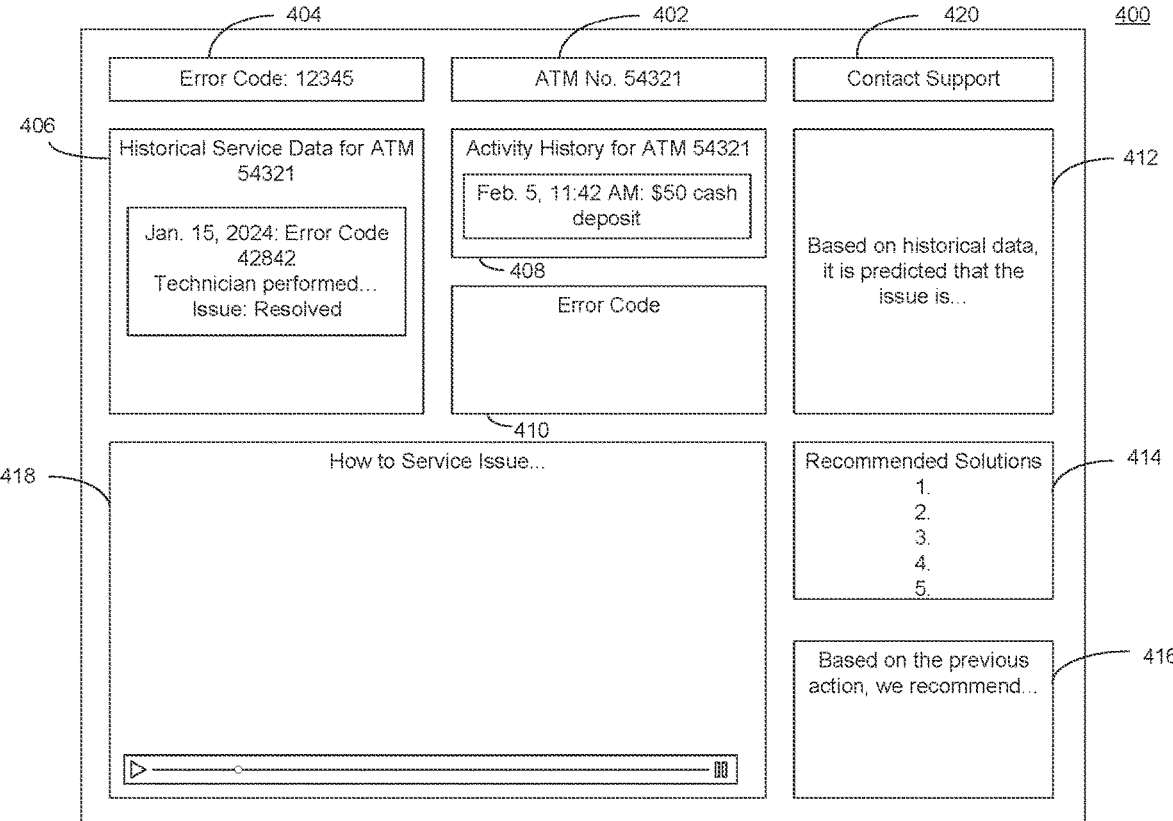
FIG. 4 is a diagram illustrating a graphical user interface of the system of FIG. 3, according to an exemplary embodiment.
Figure 5D:
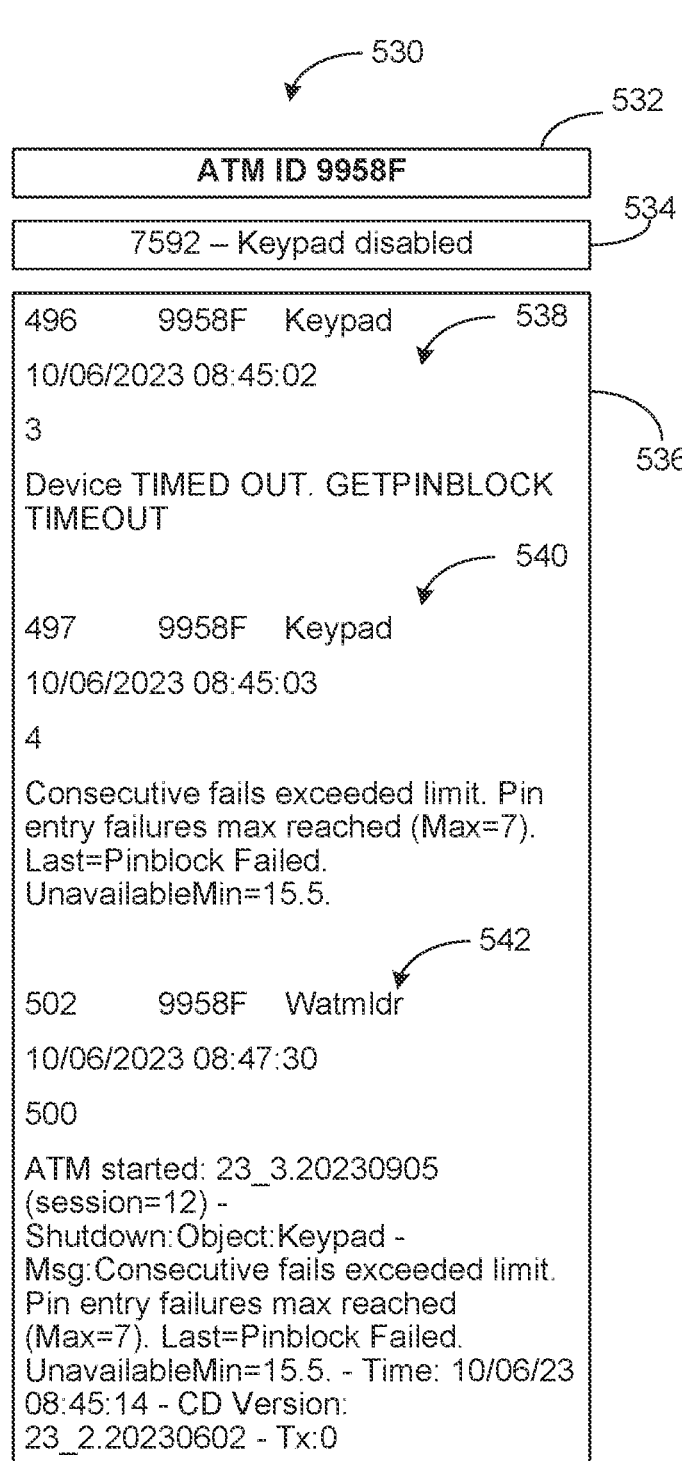
FIG. 5D is a diagram illustrating an error code of the system of FIG. 3, according to an exemplary embodiment.

Referring now to FIG. 4, a user interface (UI) 400 is shown, according to an exemplary embodiment. The user interface 400 may be configured to display data relating to the ATM 340 that is experiencing an error and is to be serviced or repaired. The user interface may be the user interface 312 of the device 324 and/or ATM 340.

The user interface 400 may display various information relating to the ATM to be serviced (i.e., ATM 340). The user interface 400 may display an identification number 402 of the ATM to be serviced. The identification number 402 may be received in connection with or responsive to receipt of the error code 342. At block 404, the user interface 400 may also display the error code that the ATM is experiencing (e.g., error code 342). Block 404 may include a brief description of the error code. For example, block 404 may display "Error Code: 12345—Dispenser jammed." The ML system 100 may generate a summary or brief description of the error code 342, which may be received by the GUI engine 332 and displayed on the UI 400. In various embodiments, the ATM may be experiencing more than one error code at a time. The user interface 400 may display some or all of the error codes experienced by the ATM. In some embodiments, the ATM 340 may experience an error but may not generate or provide an error code. For example, a bill may not be accepted by the ATM 340, but the issue occurring less than a predefined number of instances may not cause an error code to be generated.

At block 406, the user interface 400 may display service data for the ATM. The user interface 400 may display the service data by receiving the information from the GUI engine 332, which may receive the service data from the service history engine 328. The historical service data block 406 displayed by the UI 400 may include a date on which an error code 342 was generated for the ATM. The block 406 may include one or more actions taken by a technician to repair the ATM and/or resolve the error code 342. The block 406 may indicate whether the issue (i.e., the error code 342) has been resolved. In various embodiments, the block 406 may include one or more pieces of historical service data for the ATM 340. For example, block 406 may display the five most recent pieces of historical service data for the ATM 340. In some embodiments, the block 406 may indicate a time at which the error or error code occurred and/or a time at which the error was resolved. In some embodiments, block 406 may display a time at which a technician serviced the ATM but did not resolve the error.

The UI 400 may also include activity history 408. Activity history 408 may include recent non-service or error related events occurring on or at the ATM 340. For example, activity history 408 may include transactions by users of the ATM 340, such as cash or check deposits, cash withdrawals, balance checks, etc. Activity history may also include actions taken maintain operation of the ATM. For example, activity history 408 may include an indication of a replenishment of bills in the ATM 340. Activity history 408 may indicate a date and/or time at which the activity event(s) have occurred. Activity history 408 may also include a brief description of the activity performed. In various embodiments, the activity history 408 may display more than one historical event. For example, the activity history 408 may display the five most recent events that have occurred on or at the ATM 340.

In various embodiments, the UI 400 may display the error code 342 at block 410. The error code displayed at block 410 may be detailed information about the error code shown at block 404. For example, the error code displayed at block 410 may display high-level information about the error code that may be relevant to a service technician repairing the ATM 340, similar to the information displayed at block 404. In some embodiments, block 410 may display detailed fault or error data from a log of the ATM 340. An ATM log may be data stored on the ATM 340 that logs all activity of the ATM 340. Data from the ATM log may be raw data difficult for a human to parse. For example, an ATM log may include information relating to a fault or error that is readable by the ATM, rather than by a service technician of the ATM 340. The error code is shown and described in greater detail with respect to FIGS. 5A-5D.

The UI 400 may include, at block 412, a prediction of the error or issue experienced by the ATM 340. The predicted issue may be based on historical service data, activity data, etc. the predicted error may be the same as the issue indicated by the error code 404. Thus, the predicted issue at block 412 may confirm to a technician what an issue with the ATM 340 is. In various embodiments, the predicted issue at block 402 may be different than the issue indicated by error code 404. For example, the ML system 100 may incorrectly determine, based on inputs, the error. The incorrect prediction may be used as further training data for the ML system 100. In various embodiments, the predicted issue at block 412 may indicate an issue when there is no issue or error code indicated at block 404. For example, the ML system 100 may be able to identify and/or predict an upcoming issue based on the identification of actions or errors that do not result in a fault or error code. For example, the ATM 340 may have a sticky key that does not respond when the key is pressed. This problem alone may not result in an error code. The ATM 340 may be able to track, for example, when a key is pressed but there is no response, when a transaction is cancelled and other parameters relating to a cancelled transaction, and the like. The ML system 100 may receive and utilize this data to predict that there is an issue with the ATM 340 (i.e., a sticky key) despite no error code being present. In some embodiments, block 412 may indicate a problem before an error code is generated. For example, an error code may be generated only after a predetermined threshold of a number of instances of a particular issue. The ML system 100 may identify that the particular issue has occurred multiple times, but below the predetermined threshold number, and may indicate the predicted issue.

The UI 400 may include, at block 414, one or more recommended solutions or actions for a service technician to take to resolve the error code and/or repair the ATM 340. The recommended solutions are generated by the ML system 100. The GUI engine 332 may receive the recommended solutions from, for example, the ML model engine 330 and cause the recommendations to be displayed on the UI at block 414. In various embodiments, the order of the recommended actions may correspond to the actions ranked according to a score given to each action, where the score is indicative of the likelihood that the action will be successful.

The UI 400 may include, at block 416, a recommended solution for the repair technician to take. The recommended solution may be generated responsive to a previous action taken by the repair technician to service the ATM 340. The ML system 100 may be a generative artificial intelligence (GAI) system that can update recommendations in real-time. For example, the ML system 100 may identify that the repair technician has just performed an action to service the ATM 340. The ML system 100 may responsively output another action or subsequent step to take based on the previous action. While the repair technician is servicing the ATM 340, the ATM 340 (e.g., ML system 100) may, in parallel, generate and suggest solutions for the repair technician. The solutions may be responsive to or independent of the repair technician's actions. The ML system 100 may utilize, as inputs, ancillary information received from the ATM 340. For example, the ATM 340 may track a duration of time it takes for a repair technician to perform one or more actions. The ML system 100 may use the duration of time as an input. The ML system 100 may also have access to data indicating an average time it takes to perform a particular action. The ML system 100 may be configured to provide feedback indicating that an action has taken longer than usual to perform. The repair technician may provide information to the ML system 100 indicating why the action took the time it did. The ML system 100 may use that information as an input and may provide feedback to the technician on, for example, ways to decrease an amount of time it takes to perform an action. For example, if a technician indicates that an action took twice as long as the average time determined by the ML system 100 due to difficulty accessing an access panel, the ML system 100 may generate a recommendation or feedback instructing the technician on how to access the access panel more easily.

The UI 400 may provide a content item 418 illustrating how to perform one or more actions to service the ATM 340. The content item 418 may correspond to one or more recommended solution 414. The content item 418 may be, for example, a video instructing a repair technician on how to perform an action without having to rely on another technician for assistance. The ML system 100 may gather data from, for example, the data source 322, and provide a video or visual demonstration. In various embodiments, the content item 418 may provide information relating to the problem occurring on the ATM 340. For example, if an error code is generated due to a wire internal to the ATM 340 being loose, the content item 318 may be a video demonstrating how to access the wire and what to do to repair or secure the wire to resolve the loosened wire. The content item 418 may be generated in real time using a GAI system (e.g., ML system 100 is a GAI system).

The UI 400 may provide an option 420 to contact support. If an ATM 340 experiences an error, the ATM 340 may provide an initial recommendation and/or information via a device 324 of a person at the branch (e.g., a teller at the branch location of the ATM). A service technician may be dispatched to the ATM 340 to service the ATM responsive to an indication that additional support is needed. In various embodiments, the ATM 340 may initiate contact with a support person. For example, a service technician may be dispatched to the ATM 340 responsive to support being contacted. In some embodiments, a technician at the ATM 340 may use option 420 to contact additional support. Additional support may be, for example, a person at the branch or location of the ATM (e.g., a branch manager) or a person employed by the financial institution working at a remote service center. In some embodiments, the support may be an employee or technician of the ATM vendor company. In some embodiments, contacting support may involve generating a service ticket. The service ticket may be sent to a support person at one or more of the branch or location of the ATM, the remote service center, and/or the ATM vendor company. Contacting support may also involve escalating the service ticket. For example, if a service technician from the financial institution is servicing the ATM 340 but is unable to resolve the issue, the technician may escalate the previously-generated service ticket to a technician employed by the ATM vendor company.

Referring now to FIGS. 5A through 5D generally, error codes of an ATM are shown, according to various exemplary embodiments. In various embodiments, error codes for an ATM may include a high-level indication of the error code and a detailed indication of the error code. The high-level indication may be utilized by the user or technician to identify the issue with the ATM. The detailed error code information may not be readable by humans or may be difficult to parse and/or understand. The error codes described herein may be or be similar to error codes 342.

Referring to FIGS. 5A-5D, a first ATM error code 500, a second ATM error code 510, a third ATM error code 520, and a fourth ATM error code 530 are shown in FIG. 5A, FIG. 5B, FIG. 5C, and FIG. 5D, respectively. The error codes may include an ATM identification number, shown as ATM ID 502, 512, 522, and 532 in FIGS. 5A, 5B, 5C, and 5D, respectively. The error codes may also include a high level indication of the error code, shown as high level indicators 504, 514, 524, and 534 in FIGS. 5A, 5B, 5C, and 5D, respectively. The high level indicator may include a numerical code uniquely corresponding to the particular error. The high level indicator may also include a brief description of the error code. For example, in FIG. 5A, the high level indicator 504 includes a description reading "card reader disabled." In various embodiments, the ATM may include more than one error code at once. Multiple error codes and descriptions may be shown at the high level indicator 504, 514, 524, and 534.

The error codes shown in FIGS. 5A-5D may also include detailed information on the error codes, shown as detailed information 506, 516, 526, and 536 in FIGS. 5A, 5B, 5C, and 5D, respectively. The detailed information may include the piece of equipment experiencing the problem. For example, in FIG. 5B, the detailed information 516 indicates that the check reader is experiencing an issue. The detailed information may also include a date and time at which the error code was generated. The detailed information may also include details relating to the error. For example, in FIGS. 5A, 5B, and 5C, it is indicated that the equipment is disabled. Further, for example, FIG. 5A indicates that a fraud attempt was detected. The detailed information may indicate whether the issue is a hardware issue, software issue, etc.

In various embodiments, one high level error code may include multiple layers of detailed information. For example, referring to FIG. 5D, one high level error code 534 is indicated. However, within the detailed information 536, three pieces of data 538, 540, and 542 are shown, each including different layers of information. For example, at 538, the information shows that the device timed out, while at 540, it is indicated that there were consecutive failures at the keypad.

Referring now to FIG. 6, a method 600 for servicing an ATM is shown, according to an exemplary embodiment. At step 602, a machine learning model trained to determine one or more actions corresponding to ATMs is maintained. At step 604, an error code corresponding to an ATM is received.

At step 606, a service history associated with the ATM is determined. At step 608, data corresponding to the service history and the error code are applied, as inputs, to the machine learning model to determine one or more actions for responding to the error code corresponding to the ATM. At step 610, the one or more actions for rendering on a user interface are provided to facilitate servicing the ATM.

At step 602, the method 600 may include maintaining, by one or more processors (e.g., processors 306), a machine learning model trained to determine one or more actions corresponding to ATMs. The machine learning model may be, for example ML system 100. The ML system may be, in some embodiments, a generative AI system. The actions corresponding to ATMs may be, for example, steps to take to service the ATM.

In various embodiments, the method 600 further includes training, during a training phase, the machine learning model. The machine learning model may be trained using a plurality of training sets corresponding to ATM servicing. In various embodiments, the plurality of training sets include a first training set, a second training set, and a third training set. The first training set may include data corresponding to a plurality of error codes corresponding to ATMs. The second training set may include data corresponding to a plurality of service history sets for respective ATMs. The third training set may include data indicative of actions for servicing the respective ATMs. The machine learning model may be trained responsive to an indication that a predicted output of the model is different than an actual output.

In some embodiments, the machine learning model includes a first machine learning model (e.g., first ML model 103) and a second machine learning model (e.g., second ML model 105). The method 600 may further include generating, via the second machine learning model, a content item indicating the one or more actions for rendering at the device (e.g., content item 418). The content item may be, for example, a video or illustration. The content item may be generated responsive to an indication that a user has performed an action to service the ATM or responsive to an error code being generated (e.g., before a user services the ATM so that the user can utilize the content item while beginning repair). In various embodiments, the first machine learning model includes at least one of a regression model, a classification algorithm, or reinforcement learning. In various embodiments, the second machine learning model includes at least one of a generative adversarial network or a variational autoencoder.

At step 604, the method 600 may include receiving an error code corresponding to an ATM. The error code may be received by the error code engine 326 of the ATM 340 responsive to the ATM generating the error code 342. The error code may be indicative of a problem occurring on the ATM to be serviced (e.g., ATM 340). In various embodiments, receiving the error code includes receiving, during a session between an operator at a branch including the ATM and a service center, the error code corresponding to the ATM. The session may occur while the operator is attempting to fix the ATM and may receive information on how to service the ATM from an operator at the service center. The operator at the service center may possess more knowledge about ATM servicing than the operator at the branch. For example, the operator at the branch may be the branch manager. After the session between the operator at the branch and the service center, a technician may be dispatched to the branch to further service the ATM.

At step 606, the method 600 may include determining a service history 323 associated with the ATM. The service history 323 may be determined by the service history engine 328, responsive to the service system 302 receiving the error code 342 from the ATM 340 and/or responsive to the error code generator 326 transmitting the error code 342. The service history engine 328 may retrieve service history 323 from the data source 322. The service history may include previous errors/error codes of the ATM, pervious actions or events occurring at the ATM, actions that have occurred that did not result in an error code but may be indicative of an underlying problem, etc. In various embodiments, the determined service history may be associated with one or more ATMs linked to the financial institution.

At step 608, the method 600 may include applying, as an input, data corresponding to the service history and the error code to the machine learning model. The ML model engine 330 may apply the data to the ML system 100 responsive to the error code engine 326 receiving the error code and responsive to the service history engine 328 retrieving relevant service history information from the data source 322. The data may be applied to determine one or more actions for responding to the error code corresponding to the ATM. The one or more action may include actions or steps to resolve the error code.

At step 610, the method 600 may include providing the one or more actions for rendering on a user interface (e.g., user interface 312). The GUI engine 332 may provide the actions for rendering responsive to the ML system 100 generating one or more outputs (e.g., recommended actions, a content item, etc). The actions may be rendered on the user interface to facilitate servicing the ATM. In some embodiments, providing the one or more actions for rendering on the user interface includes transmitting data corresponding to the one or more actions for rendering on a device at at least one of the branch or the service center. For example, the GUI engine 332 may transmit data corresponding to actions generated by the ML system 100 to service the ATM so that the actions are displayed on the ATM being serviced.

In various embodiments, the method 600 further includes performing, at least some of the one or more actions for responding to the error code. The at least some actions may include at least one of updating a service ticket, escalating the service ticket, or dispatching a service provider to the ATM. The actions may be performed responsive to the ML system 100 generating the one or more actions and/or an indication (from, for example, the service technician) that the actions should be taken.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include software for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method comprising:
    maintaining, by one or more processors, a machine learning model trained to determine one or more actions corresponding to automated teller machines (ATMs);
    predicting or receiving, by the one or more processors, an error code corresponding to an ATM;

receiving, by the one or more processors, via an audio device of the ATM, an audio input from a user regarding an error of the ATM;

determining, by the one or more processors, a service history associated with the ATM;

comparing, by the one or more processors, the error code and one or more problems regarding the ATM not resulting in an error code to identify one or more trends between the error code and the one or more problems;

determining, based on the comparison, a predicted issue affecting the ATM;

applying, by the one or more processors as an input, data corresponding to the service history, the audio input, the predicted issue, and the error code to the machine learning model, to determine one or more actions for responding to the error code corresponding to the ATM; and providing, by the one or more processors, the one or more actions for rendering on a user interface, to facilitate servicing the ATM.

2. The method of claim 1, further comprising training, by the one or more processors, during a training phase, the machine learning model using a plurality of training sets corresponding to ATM servicing.

3. The method of claim 2, wherein the plurality of training sets comprise a first training set, a second training set, and a third training set, the first training set comprising data corresponding to a plurality of error codes corresponding to ATMs, the second training set comprising data corresponding to a plurality of service history sets for respective ATMs, and the third training set comprising data indicative of actions for servicing the respective ATMs.

4. The method of claim 1, wherein receiving the error code comprises receiving, by the one or more processors, during a session between an operator at a branch including the ATM and a service center, the error code corresponding to the ATM.

5. The method of claim 4, wherein providing the one or more actions for rendering on the user interface comprises transmitting, by the one or more processors, data corresponding to the one or more actions for rendering on a device at at least one of the branch or the service center.

6. The method of claim 5, wherein the machine learning model comprises a first machine learning model, the method further comprising:

generating, by the one or more processors, via a second machine learning model, a content item indicating the one or more actions for rendering at the device.

7. The method of claim 6, wherein the first machine learning model comprises at least one of a regression model, a classification algorithm, or reinforcement learning, and wherein the second machine learning model comprises at least one of a generative adversarial network or a variational autoencoder.

8. The method of claim 1, further comprising performing, by the one or more processors, at least some of the one or more actions for responding to the error code.

9. The method of claim 8, wherein the at least some of the one or more actions comprise at least one of updating a service ticket, escalating the service ticket, or dispatching a service provider to the ATM.

10. A system comprising:

a processing circuit comprising one or more processors and memory storing instructions that, when executed by the one or more processors, cause the processing circuit to:

maintain a machine learning model trained to determine one or more actions corresponding to automated teller machines (ATMs);

predict or receive an error code corresponding to an ATM;

receive, via an audio device of the ATM, an audio input from a user regarding an error of the ATM;

determine a service history associated with the ATM;

compare the error code and one or more problems regarding the ATM not resulting in an error code to identify one or more trends between the error code and the one or more problems;

determine, based on the comparison, a predicted issue affecting the ATM;

apply, as an input, data corresponding to the service history, the audio input, the predicted issue, and the error code to the machine learning model, to determine one or more actions for responding to the error code corresponding to the ATM; and provide the one or more actions for rendering on a user interface, to facilitate servicing the ATM.

11. The system of claim 10, wherein the instructions further cause the processing circuit to train, during a training phase, the machine learning model using a plurality of training sets corresponding to ATM servicing.

12. The system of claim 11, wherein the plurality of training sets comprise a first training set, a second training set, and a third training set, the first training set comprising data corresponding to a plurality of error codes corresponding to ATMs, the second training set comprising data corresponding to a plurality of service history sets for respective ATMs, and the third training set comprising data indicative of actions for servicing the respective ATMs.

13. The system of claim 10, wherein the instructions that cause the processing circuit to receive an error code further cause the processing circuit to receive, during a session between an operator at a branch including the ATM and a service center, the error code corresponding to the ATM.

14. The system of claim 13, wherein the instructions that cause the processing circuit to provide the one or more actions for rendering on the user interface further cause the processing circuit to transmit data corresponding to the one or more actions for rendering on a device at at least one of the branch or the service center.

15. The system of claim 14, wherein the machine learning model comprises a first machine learning model, and wherein the instructions further cause the processing circuit to:

generate, via a second machine learning model, a content item indicating the one or more actions for rendering at the device.

16. The system of claim 15, wherein the first machine learning model comprises at least one of a regression model, a classification algorithm, or reinforcement learning, and wherein the second machine learning model comprises at least one of a generative adversarial network or a variational autoencoder.

17. The system of claim 10, wherein the instructions further cause the processing circuit to perform at least some of the one or more actions for responding to the error code.

18. The system of claim 17, wherein the at least some of the one or more actions comprise at least one of updating a service ticket, escalating the service ticket, or dispatching a service provider to the ATM.

19. A non-transitory computer readable medium storing instructions that, when executed by one or more processors, cause the one or more processors to:

US 12,646,037 B2

27 maintain a machine learning model trained to determine one or more actions corresponding to automated teller machines (ATMs);

predict or receive an error code corresponding to an ATM;

receive, via an audio device of the ATM, an audio input from a user regarding an error of the ATM;

determine a service history associated with the ATM;

compare the error code and one or more problems regarding the ATM not resulting in an error code to identify one or more trends between the error code and the one or more problems;

determine, based on the comparison, a predicted issue affecting the ATM;

apply, as an input, data corresponding to the service history, the audio input, the predicted issue, and the error code to the machine learning model, to determine one or more actions for responding to the error code corresponding to the ATM; and provide the one or more actions for rendering on a user interface, to facilitate servicing the ATM.

20. The non-transitory computer readable medium of claim 19, wherein the instructions further cause the one or more processors to train, during a training phase, the machine learning model using a plurality of training sets corresponding to ATM servicing.

* * * * *

28